US011555965B1

(12) United States Patent
Rushford et al.

(10) Patent No.: US 11,555,965 B1
(45) Date of Patent: Jan. 17, 2023

(54) ILLUMINATION FRUSTUMS FOR PHOTOCONDUCTIVE SWITCHES

(71) Applicant: Lawrence Livermore National Security, LLC, Livermore, CA (US)

(72) Inventors: Michael Rushford, Livermore, CA (US); Adam Conway, Livermore, CA (US); Lars F. Voss, Livermore, CA (US); Joseph D. Schneider, Livermore, CA (US); Tammy Chang, Livermore, CA (US); Caitlin Anne Chapin, Livermore, CA (US); John Berns Lancaster, Livermore, CA (US); Steve Hawkins, Livermore, CA (US); Victor Valeryevich Khitrov, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 7 days.

(21) Appl. No.: 17/372,366

(22) Filed: Jul. 9, 2021

(51) Int. Cl.
*G02B 6/26* (2006.01)

(52) U.S. Cl.
CPC .................... *G02B 6/262* (2013.01)

(58) Field of Classification Search
CPC .................................................. G02B 6/262
See application file for complete search history.

(56) References Cited

U.S. PATENT DOCUMENTS

| 3,389,950 A | * | 6/1968 | Harper | G02B 26/103 |
| | | | | 385/116 |
| 3,921,705 A | * | 11/1975 | Furuse | B22D 5/005 |
| | | | | 164/331 |
| 4,611,885 A | * | 9/1986 | Boirat | G02B 6/3528 |
| | | | | 385/25 |
| 8,238,042 B2 | | 8/2012 | Dewitt et al. | |

(Continued)

FOREIGN PATENT DOCUMENTS

| DE | 102017116477 A1 * | 1/2019 | ......... B23K 26/0643 |
| FR | 2639472 A1 * | 5/1990 | ............. B82Y 10/00 |

OTHER PUBLICATIONS

Xu, Miaomiao, et al., "Methods of optimizing and evaluating geometrical lightguides with micro structure mirrors for augmented reality displays," Optics Express vol. 27, No. 4, 2019.

*Primary Examiner* — Andrew Jordan
(74) *Attorney, Agent, or Firm* — Perkins Coie LLP

(57) ABSTRACT

Methods and devices for illuminating a photoconductive switch consisting of an optically actuated photoconductive material situated between two electrodes are described. Light from a light source is coupled to an optical fiber, which is attached to a frustum, the other side of which is proximate to the photoconductive switch. Light from the optical fiber enters the frustum, spreads out, and enters the photoconductive switch via the top-side electrode. Some of the light is absorbed, while the remaining light reflects off the bottom-side electrode, travels back through the photoconductive switch, and any unabsorbed light reenters the frustum. The geometry of the frustum is configured such that most of the (Continued)

light reflects back into the switch itself with only a negligible fraction escaping from the optical fiber, which advantageously results in near total utilization of the light.

22 Claims, 10 Drawing Sheets

(56) References Cited

U.S. PATENT DOCUMENTS

| | | |
|---|---|---|
| 10,530,362 B2 | 1/2020 | Voss et al. |
| 2010/0309566 A1* | 12/2010 | DeWitt ................ G02B 17/084 359/729 |

* cited by examiner

ILLUMINATION FRUSTUMS FOR PHOTOCONDUCTIVE SWITCHES

STATEMENT REGARDING FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

This patent document relates to axially illuminated photoconductive switches.

BACKGROUND

Power semiconductors switching devices are integral to modern power electronics converters and enable enormously short switching times that are required for many applications including inverters, pulsed power, and generation of electromagnetic waves. Existing switches are illuminated by an external light source and are configured to maintain a high stand-off voltage. However, these existing switches are unable to make efficient use of the incident light.

SUMMARY

Embodiments of the disclosed technology relate to frustums that enable the axial illumination of photoconductive switches. Among other features and benefits, the disclosed embodiments make efficient use of the incident light while maintaining a high stand-off (or breakdown) voltage. The disclosed embodiments can, for example, be used in many fields wherein switching accuracy and high electric field capabilities are required, such as in microwave and millimeter wave generation, impulse ultrawideband radar, and pulsed power systems, particle accelerators, direct energy systems, high-voltage pulse generation, and electron-beam pumped lasers.

The disclosed embodiments include devices and methods for illuminating a photoconductive (or semiconductor) switch. In an example aspect, a frustum for delivering illumination to a photoconductive switch includes a top section having a first cross-sectional area and configured to receive light having a first irradiance, and a bottom section configured to receive light from the top section and to allow the received light to propagate through the bottom section and reach a lower opening, the lower opening having a larger cross-sectional area than the first cross-sectional area, wherein the bottom section comprises an axially symmetric region bounded by an inner surface and an outer surface to allow the light that is received by the bottom section to travel through the axially symmetric region before reaching the lower opening, and wherein the lower opening is configured to deliver light to a photoconductive material having a second irradiance that is lower than the first irradiance.

In another example aspect, device for illuminating a photoconductive material includes a truncated cone comprising an upper surface with a first diameter that is configured to receive illumination having a first irradiance from an optical fiber, and a lower surface with a second diameter that is proximate to an upper surface of a cylinder, the second diameter being larger than the first diameter, and the cylinder comprising the upper surface configured to receive illumination from the truncated cone, and a lower surface, proximate to a photoconductive material, configured to deliver light to the photoconductive material having a second irradiance that is lower than the first irradiance, wherein the truncated cone and the cylinder are configured to propagate the light from the upper surface of the truncated cone to the lower surface of the cylinder using total internal reflection.

In yet another example aspect, method for delivering illumination to a photoconductive switch includes receiving, by a top section of a frustum having a first cross-sectional area, light from an optical fiber with a first irradiance, and guiding the light from the top section through a bottom section to reach a lower opening, the lower opening having a larger cross-sectional area than the first cross-sectional area, wherein the bottom section comprises an axially symmetric region bounded by an inner surface and an outer surface to allow the light that is received by the bottom section to travel through the axially symmetric region before reaching the lower opening, and wherein the lower opening is configured to deliver light to a photoconductive material having a second irradiance that is lower than the first irradiance.

DETAILED DESCRIPTION

A photoconductive switch (also referred to as a semiconductor switch) is comprised of a photoconductive material (e.g., a wide bandgap semiconductor such as Sic, GaN, GaAs or diamond), electrodes that are typically positioned on the top and the bottom of the photoconductive material for applying a voltage and collecting current, and a light source of appropriate energy and wavelength to optically generate current. Light can be coupled to the photoconductive material in different configurations, such as from side (or lateral) or top/bottom (axial) positions. In some configurations light from the light source is incident on the top electrode, enters the photoconductive material (e.g., through transparent electrode, one or more transparent windows, and the like), and generates free carriers in the photoconductive material, which then contributes to the conductivity of the semiconductor switch.

Embodiments of the disclosed technology include a device that is simultaneously capable of making efficient use of the incident light while maintaining a high stand-off (or breakdown) voltage for the photoconductive switch. The high stand-off voltage is made possible by the use of sub-band gap light with relatively low absorption coefficient. This enables uniform excitation of the bulk of switch, which allows for the use of relatively large thickness. If light with higher absorption coefficient were used, only a small thickness of material could be "turned on", necessitating a small thickness and hence a lower voltage. However, the low absorption coefficient results in poor light utilization in most designs.

Some existing implementations use edge illumination, which introduces the light through the side. The long path length gives moderate light utilization capability, but most of the light is still able to escape out through the other side(s) of the material. Other implementations use axial geometry, wherein the light is introduced normal to the top surface, or total internal reflection (TIR) geometry, wherein the light was introduced through a small notch on the corner (as depicted in FIG. 1), which enables near total absorption of the light.

Figure 1:
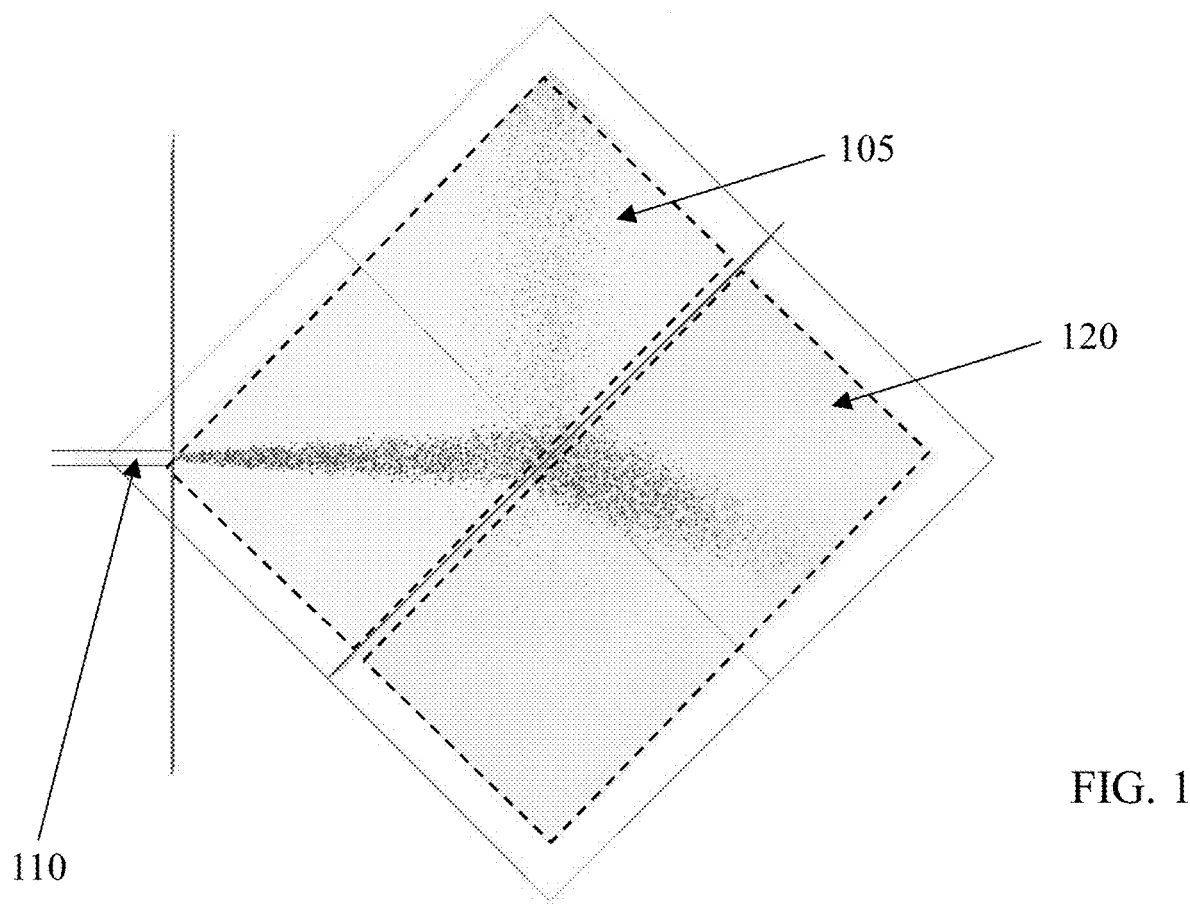
FIG. 1 illustrates an example of illuminating a switch from a corner.

As illustrated in FIG. 1, an optical fiber source 110 introduces light through a small notch on the corner of a device, which is made flat, and that comprises a region with low absorption 105 (e.g., non-absorbing $SiO_2$) that is adjacent to the switch (or photoconductive material) 120. The non-absorbing $SiO_2$ region 105 has a higher laser damage threshold (LDT) than the LDT of the photoconductive material 120. As depicted in FIG. 1, the region 105 is in optical contact with the photoconductive material 120 such that the light from the optical fiber 110 that is incident into the region 105 can couple to the region 120.

The light levels in the non-absorbing $SiO_2$ region 105 and reflects from the photoconductive material 120. That is, region 105 becomes a TIR oven with light spreading and entering photoconductive material 120 with a larger beam footprint with a reduced intensity (e.g., in joules/cm²). Because region 120 is an absorbing material (in comparison to the non-absorbing $SiO_2$ region 105), photoconductivity changes are maximum at the interface between region 105 and region 120, which is not ideal because for efficient operation, the region 120 should conduct current uniformly.

The black dots illustrated in region 105 indicate the intensity (in joules/cm²) in the TIR, as and shown therein, the maximum absorption takes place on the first beam encounter at the boundary of the non-absorbing $SiO_2$ and photoconductive material regions, with the intensity subsequently falling off in region 105 due to Beer's law absorption. The maximum light being absorbed at the boundary is not ideal as it likely would lead to an electrical breakdown and damage the switch 120, which motivates, in part, the embodiments described herein.

The disclosed technology overcomes these drawbacks and provides other benefits and advantages by providing a frustum that couples the illumination (e.g., provided via a waveguide such as an optical fiber) to the photoconductive switch, and advantageously spreads the incident light across a larger region on the surface of the switch. The high-intensity irradiance at the output of the fiber optic, which would typically damage the photoconductive switch, is thus reduced to an irradiance intensity that is below the damage threshold of the switch. Additional features and benefits provided by the disclosed embodiments include minimizing the amount of light that escapes the frustum or optical fiber, increasing the coupling or injection efficiency of the incident light, and maintaining the high stand-off voltage of the semiconductor switch.

The described embodiments enable the irradiance on the photoconductive material to be spread out over a larger surface area (compared to the cross-sectional area of the optical fiber), which results additional resistances in parallel in the photoconductive material, and thus, a reduced resistance of the photoconductive switch when it is on.

Figure 2:
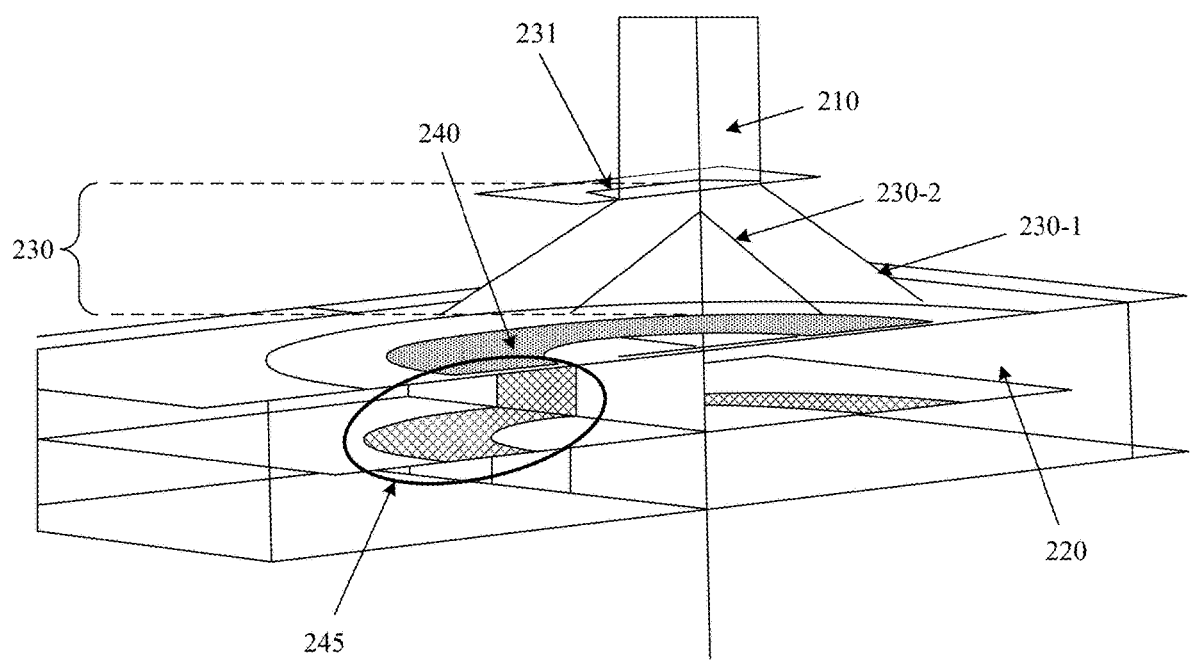
FIG. 2 illustrates the use of a conical frustum in the example depicted in FIG. 2.

FIG. 2 illustrates an example of an optical fiber illuminating a photoconductive switch using a frustum in accordance with an example embodiment. As depicted therein, an optical fiber 210 is axially coupled to the frustum 230, which is located on an upper surface of the photoconductive switch 220.

In some embodiments, the geometry of the frustum 230 can be configured based on the intensity of light produced by the optical fiber 210 (or equivalently, the diameter of the optical fiber 210) to enable the intensity of the light incident on the upper surface of the photoconductive switch 220 to be tailored. As discussed earlier, if the optical fiber 210 were directly coupled to the photoconductive switch 220, the intensity of the light incident thereon would likely exceed the damage threshold of the photoconductive switch 220. In an example, the irradiance (defined as the radiant flux received by a surface per unit area (normal to the direction of flow of radiant energy through a medium)) is the metric used to determine and/or calibrate the damage threshold.

Continuing with the description of FIG. 2, the frustum 230 consists of an outer truncated cone 230-1 and an inner cone 230-2, whose apex is substantially aligned with a center of an upper opening of the outer truncated cone 230-1. The lower openings of the outer truncated cone 230-1 and the inner cone 230-2 are in a common plane that is proximate and parallel to the upper surface of photoconductive switch. The upper opening of the outer truncated cone 230-1 is coupled to a waveguide, such as an optical fiber 210, that delivers the incident light from the light source. To facilitate the description, the frustum of FIG. 2 can be considered as including a top section 231 and a bottom section that includes 230-1 and 230-2. The top section (e.g. at the very top of the frustum) has a first cross-sectional area that receives the input light. The top section is immediately met by the bottom section that includes the axially symmetric light-carrying region with a lower opening as described below.

In some embodiments, an inner surface of the outer truncated cone 230-1 and an outer surface of the inner cone 230-2 are made reflective (e.g., coated with a reflective coating). In other embodiments, the outer truncated cone 230-1 and the inner cone 230-2 may be made of a reflective metal. In this, configuration, the incident light travels through the optical fiber 210, enters the frustum through its top surface, and travels through the region bounded by the outer truncated cone 230-1 and the inner cone 230-2. This axially symmetric region allows light to travel therethrough and emerge from the bottom of the frustum (in the example configuration of FIG. 2, as an annulus 240) and enter the photoconductive material. Compared to the input light delivered by the optical fiber 210, the light that exits the frustum is spread out over a larger area on the surface of the semiconductor switch such that the level of irradiance remains below the damage threshold of the photoconductive switch. In one example configuration, the peak irradiance from the fiber is made 27 times smaller in the annular irradiance that enters the photoconductive material. In another example, the reduction factor is 45 times.

In some embodiments, the top electrode is a metal grid, e.g., a gold grid, or a transparent conductor, e.g., indium tin oxide, and the bottom (ground) electrode is made from a reflective conductor. The reflective conductor may be selected based on the wavelength of operation, e.g., silver or aluminum for 532 nm. This results in the light that is incident on the top electrode to propagate through the photoconductive switch and reflect off the bottom electrode. Some of this reflected light may reenter the frustum. However, the geometries of the outer truncated cone 230-1 and the inner cone 230-2 can be configured to ensure that only a negligible fraction of the light escapes back through the optical fiber 210, and that the majority of the light enters the photoconductive switch. This process repeats until all the light emitted by the optical fiber 210 is absorbed.

In some embodiments, the geometries of the outer truncated cone 230-1 and the inner cone 230-2 can be configured to meet size, weight, and power (SWaP) constraints. For example, the angles of the cones can be adjusted to reduce the height of the cones to provide an equivalent irradiance on the photoconductive switch, but with a smaller overall volume. In one example configuration, the optical fiber 210 has an inner diameter (ID) of 1 mm.

In some embodiments, the frustum is placed in physical contact with the switch. In other embodiments, the frustum may be bonded directly to the switch. The outer truncated cone 230-1 and the inner cone 230-2 are configured such that the space between the cones is smaller near the optical fiber 210 and larger near the surface of the photoconductive switch. This ensures that a majority of the light enters the photoconductive switch and propagates therein (depicted using a ray-tracing model 245 in FIG. 2). In other embodiments, the angles of the outer truncated cone 230-1 and the inner cone 230-2 are optimized (e.g., using optical simulations) to maximize the energy on the photoconductor switch and minimize the energy returning to the optical fiber.

In some embodiments, as shown in FIG. 2, the outer truncated cone 230-1 and the inner cone 230-2 may be circular, i.e., the lower openings are circles or ellipses. In other embodiments, the outer truncated cone 230-1 and the inner cone 230-2 may be substantially pyramidal, i.e., the lower openings are polygons.

Figure 3:
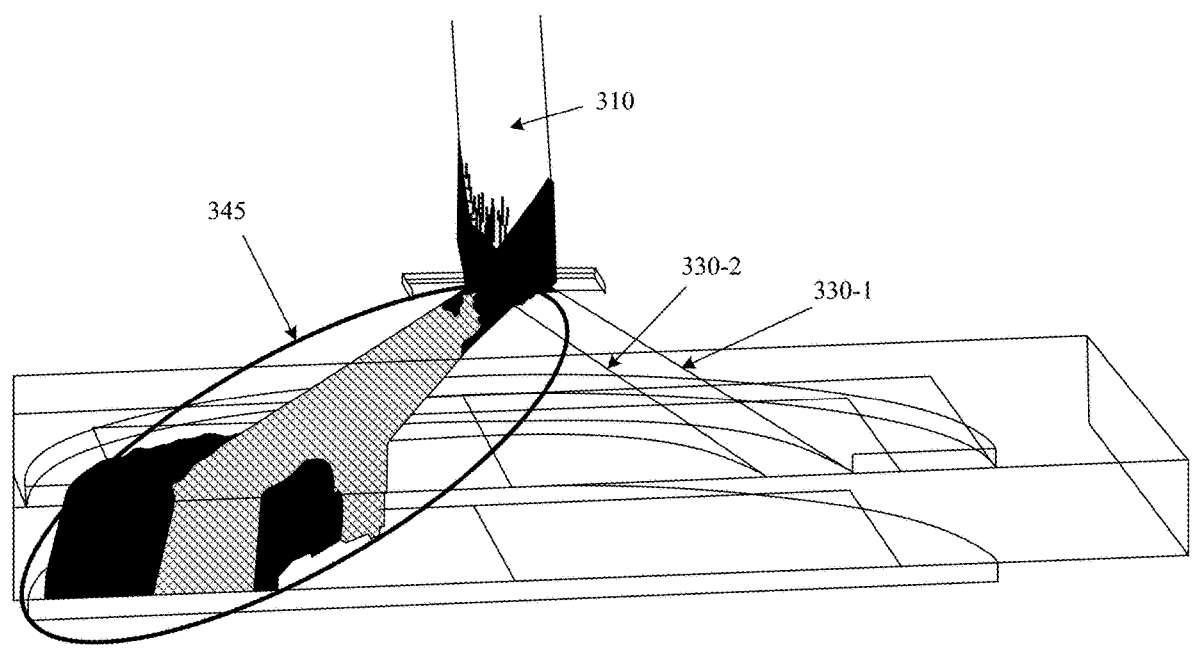
FIG. 3 illustrates an example of propagation of free carriers in the photoconductive switch depicted in FIG. 2 using a ray-tracing model.

FIG. 3 illustrates an example of propagation of light in the photoconductive switch depicted in FIG. 2 using a ray-tracing model 345. As depicted therein, the light is guided through the region between the outer truncated cone 330-1 and inner cone 330-2, and then propagates through the photoconductive switch toward the bottom electrode.

Figure 4A:
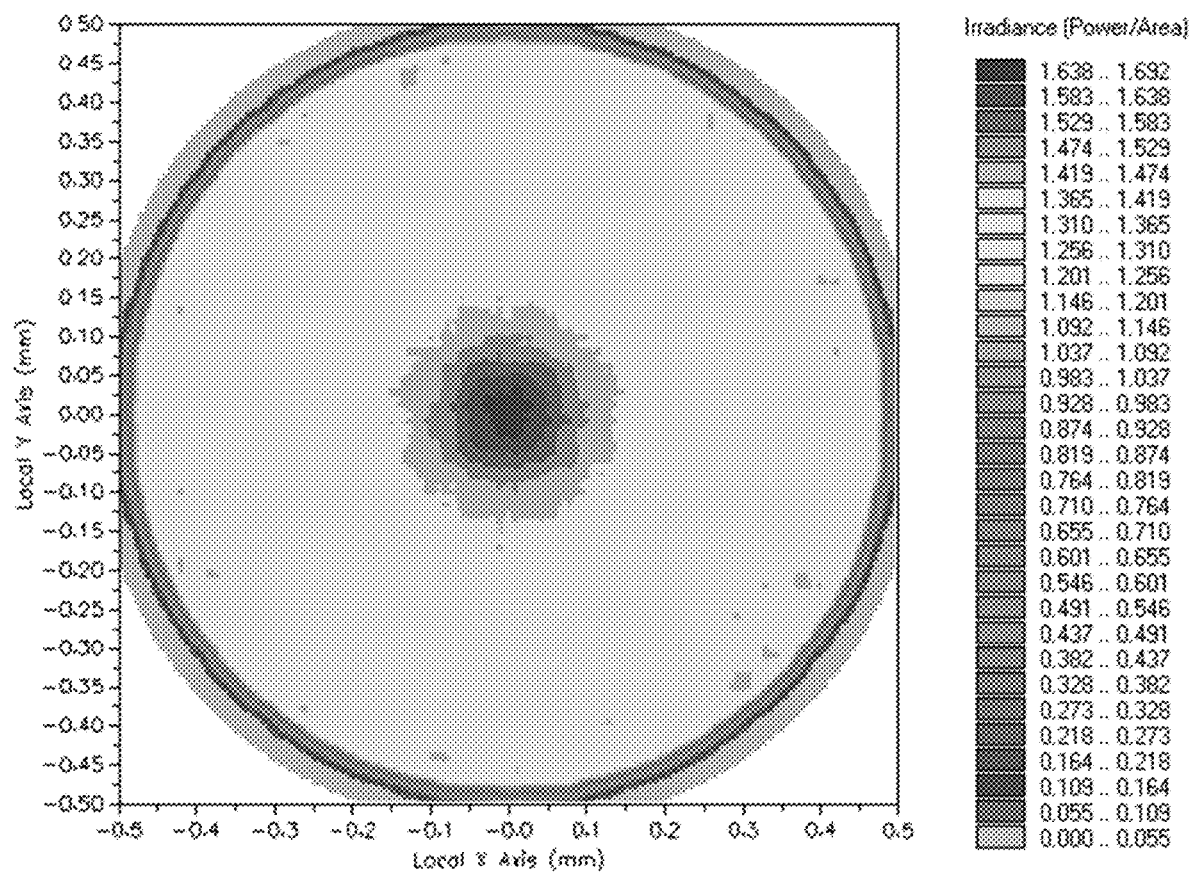
FIG. 4A illustrates an example of the irradiance of an optical fiber source.
Figure 4B:
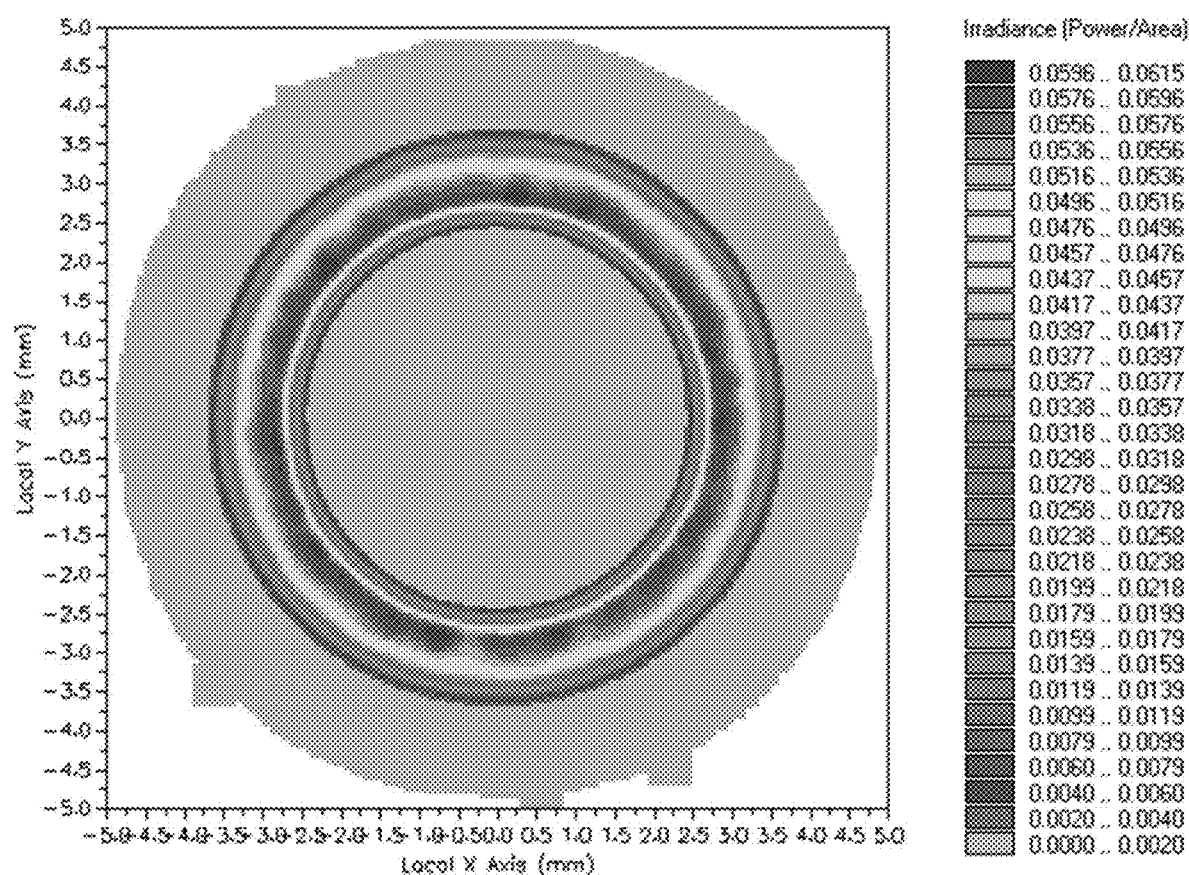
FIG. 4B illustrates an example of the irradiance on the photoconductive switch.

FIGS. 4A and 4B illustrate examples of the irradiance at the output of the optical fiber and on the photoconductive switch, respectively. As depicted therein, the irradiance at the output of the optical fiber as shown in FIG. 4A is high and constant over the entire cross-section of the optical fiber. In contrast, as shown in FIG. 4B, the irradiance on the photoconductive switch is high only in an annular region that corresponds to the area between the outer truncated cone and the inner cone, and the peak irradiance is reduced considerably compared to FIG. 4A. Thus, the frustum advantageously spreads the light output from the optical fiber over a larger annular area on the photoconductive switch such that the damage threshold on the switch is not exceeded.

Figure 5:
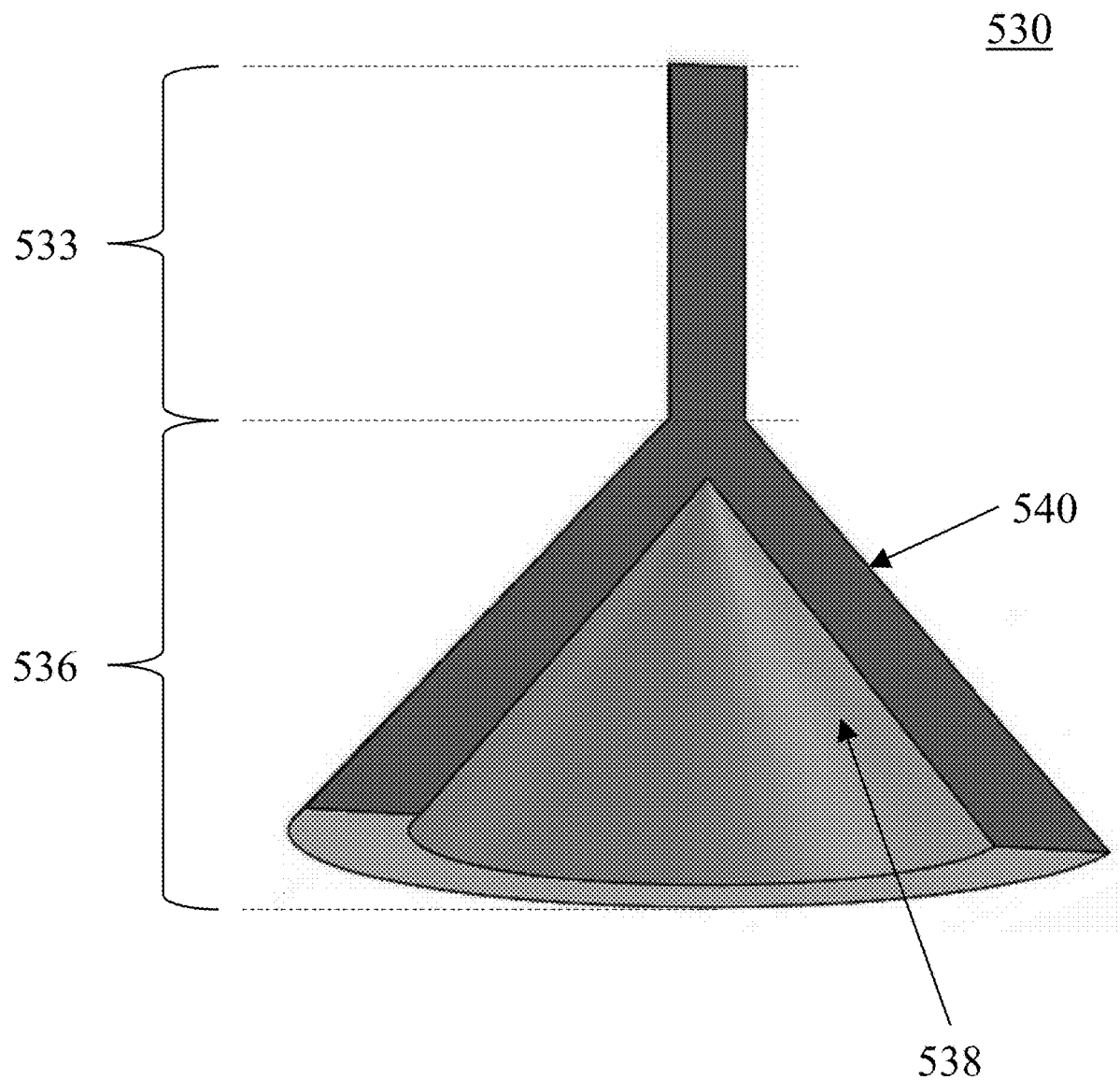
FIG. 5 illustrates another example of a frustum.

FIG. 5 illustrates another example of a frustum in accordance with an example embodiment. As depicted therein, this frustum 530 includes of a top section 533 and a bottom section 536. In some embodiments, the top section 533 is substantially cylindrical with its top surface coupled to an optical fiber (not shown in FIG. 5) and its bottom surface coupled to the bottom section 536. The bottom section 536 is a cone with a thickness that is substantially similar to the diameter of top section 533. In an example, the bottom section 536 is a cone with a bottom surface that is a circle or an ellipse. In another example, the bottom section 536 is pyramidal with a bottom surface that is a polygon. In some embodiments, a length of the top section 533 and the bottom section 536 are similar.

The example frustum depicted in FIG. 5 receives light from an optical source at the top section 533, the light travels through the top section 533, reaches the top of the bottom section 536, and travels within the region bounded by the inner surface 538 and the outer surface 540. The light that emerges from the bottom surface of the bottom section 536 is thus spread over the larger annular region and subsequently enters the photoconductive material (not shown in FIG. 5). The axially symmetric region between the inner and outer surfaces has an index of refraction that is higher than the refractive index of the cone of the bottom section 536, and the region outside of the outer surface. Thus, the light is guided using total internal reflection (TIR), and its irradiance/area (e.g., measured in Joules/cm$^2$) is reduced as the light is spread over the larger area of the bottom section 536. In this configuration, the dimensions and angles of the various sections of the frustum are designed to enable light to travel via TIR. This limitation is not present in the frustums that utilize reflective surfaces around the light-carrying regions (e.g., see FIG. 2) at the cost of additional complexity of design. Additionally, the frustum that is shown in FIG. 5 can be fully made of glass, which has a very high damage threshold compared to frustums that require other materials.

In an example, the frustum is made of glass, and the thickness of the bottom section 636 is approximately 1 mm, the lengths of the top and bottom sections are approximately 10 mm, the half angle of the cone is approximately 40°, and the top section has an outer diameter of 1.5 mm and interfaces with an optical fiber with an outer diameter of 1.2 mm. In this example, the irradiance exiting the optical fiber can be 10 J/cm$^2$, which is reduced to 20 mg./cm$^2$ around the annular area that is proximate (or in contact with) the top electrode on the upper surface of the photoconductive switch. This reduced irradiance is below the damage threshold of the photoconductive material.

Figure 6:
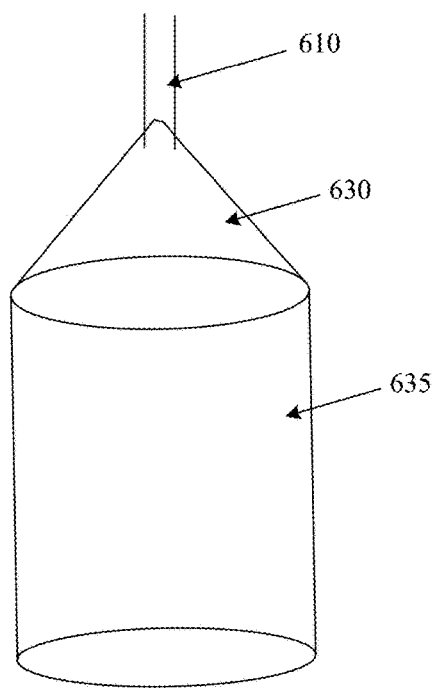
FIG. 6 illustrates another example of a frustum that interfaces with a solid cylinder.

FIG. 6 illustrates yet another example of a frustum that interfaces with a solid cylinder to illuminate a photoconductive material. As shown therein, an upper surface of the frustum 630 is axially coupled to an optical fiber 610 and the bottom surface is axially coupled to the cylinder 635. In this embodiment, both the frustum 630 and the cylinder are solid and have a refractive index that is different from the space around it. This results in light from the optical fiber 610 that enters the frustum 630 to propagate, through the entire cross-section of the cylinder 635, to the bottom of the solid cylinder 635 via TIR. Thus, the higher irradiance light from the optical fiber 610 is spread over a larger cross-sectional area of the bottom of the solid cylinder 635, which is proximate to the photoconductive material (not shown in FIG. 6). In an example, the solid cylinder 635 has an outer diameter of 4 mm and a length of 5 mm.

Figure 7:
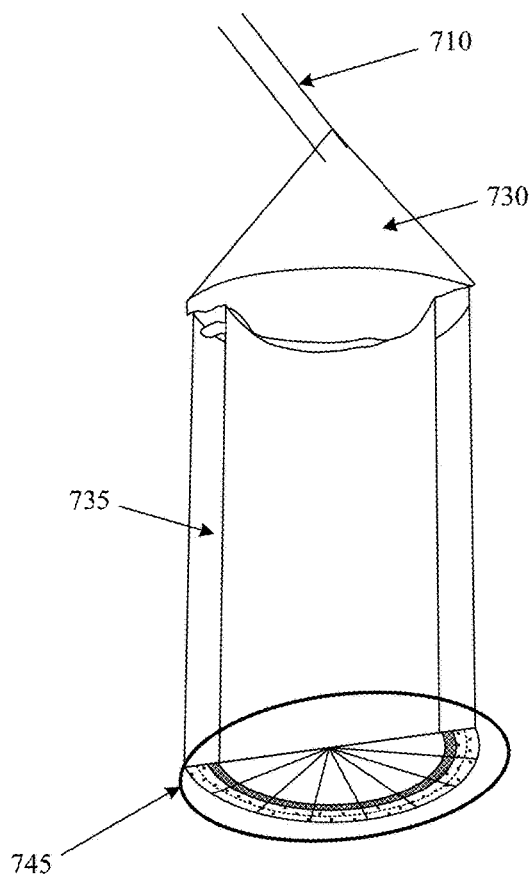
FIG. 7 illustrates another example of a frustum that interfaces with a hollow cylinder.

FIG. 7 illustrates yet another example of a frustum that interfaces with a hollow cylinder to illuminate a photoconductive material. As shown in the cross-sectional view therein, an upper surface of the frustum 730 is coupled, at an angle, to an optical fiber 710 and the bottom surface is axially coupled to the cylinder 735. In this embodiment, the cylinder 735 is a hollow cylinder and the frustum 730 is a truncated cone. This results in light from the optical fiber 710 that enters the frustum 730 to propagate through the walls of the hollow cylinder 735 via TIR. Thus, the higher irradiance light from the optical fiber 710 is spread over the larger annular cross-section of the bottom of the hollow cylinder 735, which is proximate to the photoconductive material (not shown in FIG. 7). In an example, the photoconductive material may be coupled to electrodes configured in a coaxial arrangement.

Figure 8:
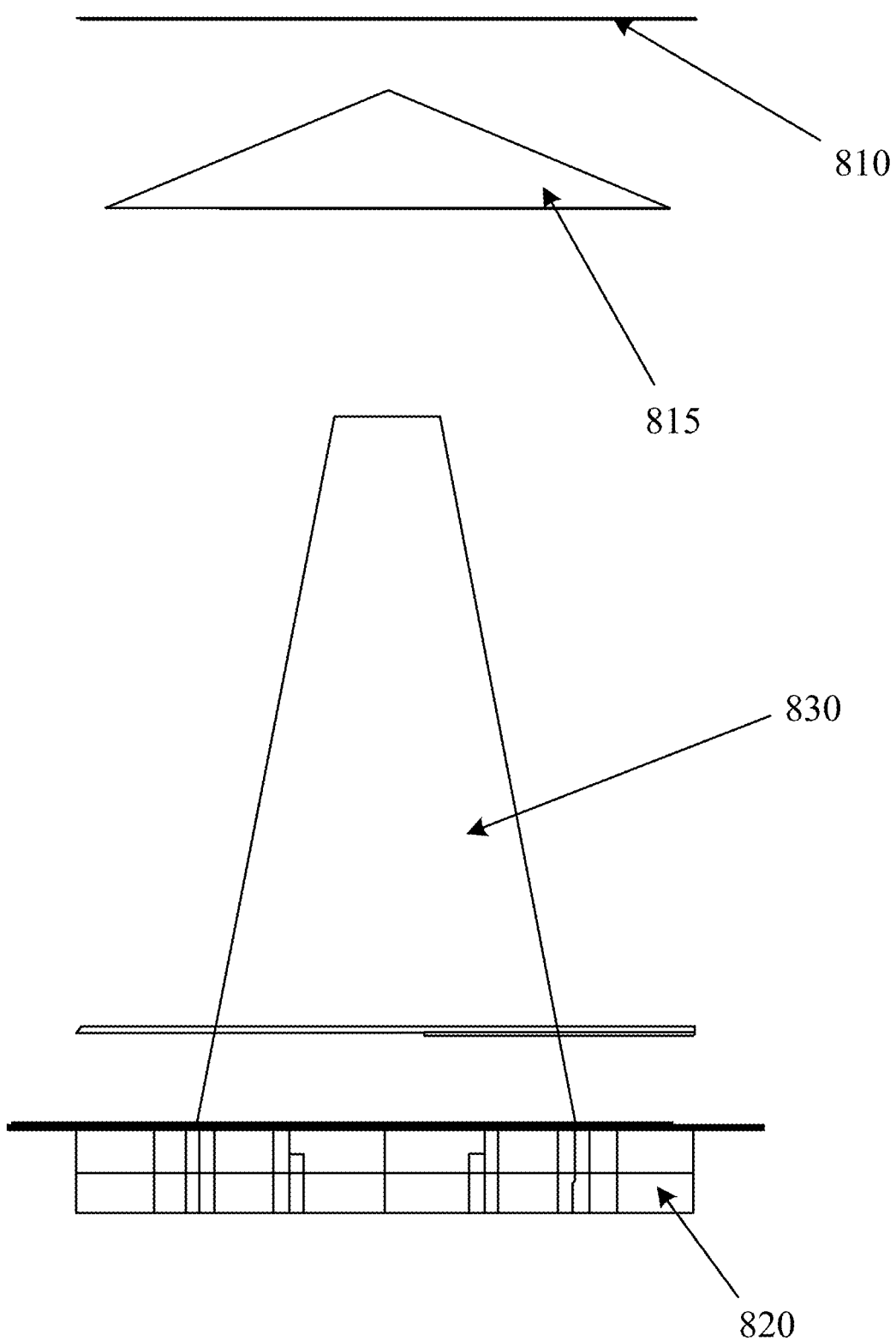
FIG. 8 illustrates an example of illuminating a photoconductive switch using an axicon and a hollow truncated cone frustum.

FIG. 8 illustrates an example of illuminating a photoconductive switch using an axicon and a hollow truncated cone frustum. An axicon, also known as a rotationally symmetric prism, is a lens that features one conical surface and one plano surface. Axicons are commonly used to create a beam with a Bessel intensity profile or a conical, non-diverging beam. As depicted in FIG. 8, an input Gaussian beam 810 is incident on the axicon 815, which axially reverses the irradiance and redirects it to the hollow frustum 830. This results in an annular irradiance pattern on the photoconductive switch 820. The absorbed energy density in the photoconductive material is a function of the absorption coefficient of the material.

Figure 9:
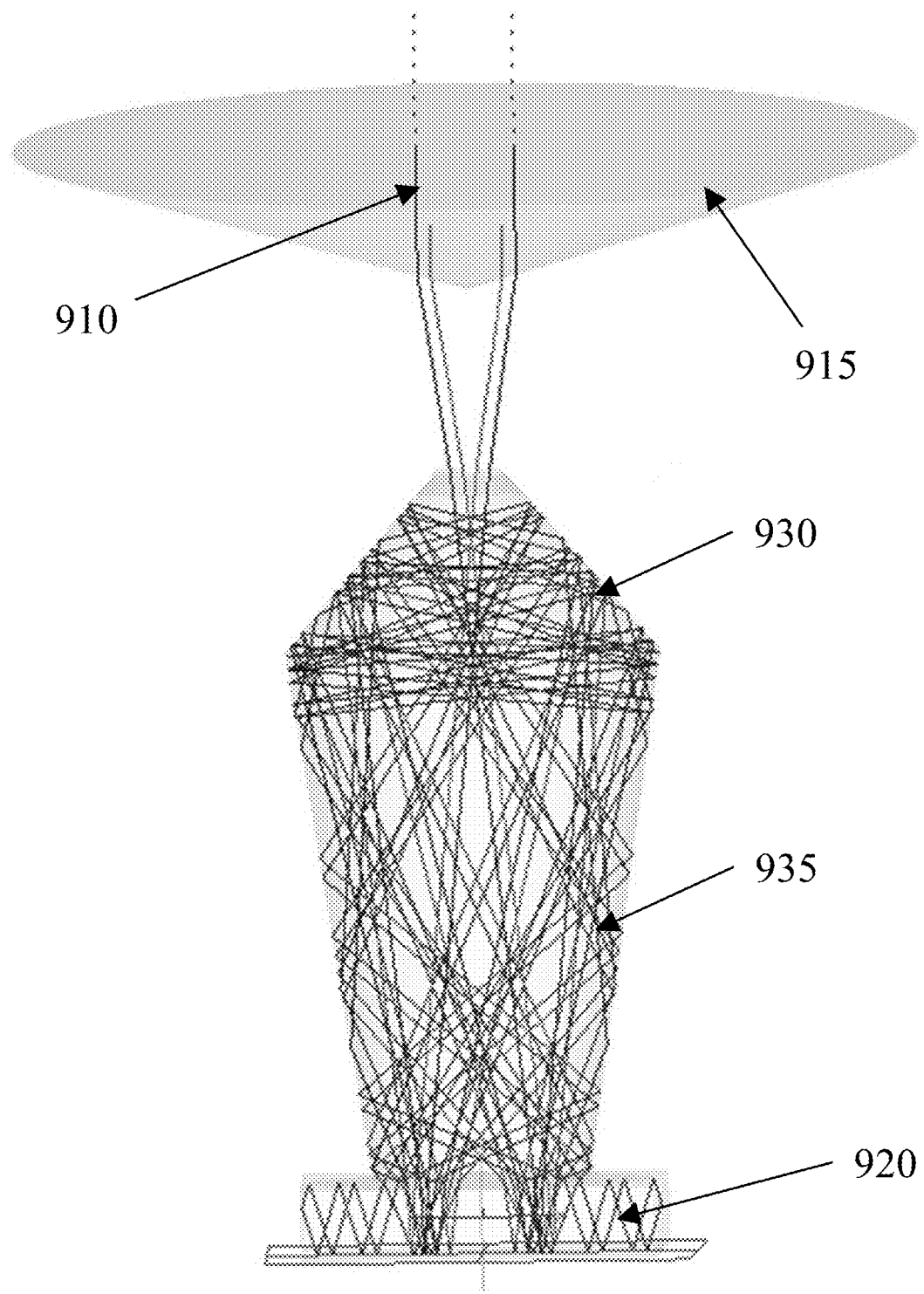
FIG. 9 illustrates another example of illuminating a photoconductive switch using an axicon and a frustum that interfaces with an inverted truncated cone.

FIG. 9 illustrates another example of illuminating a photoconductive switch using an axicon and a frustum that interfaces with a solid cylinder. As depicted in FIG. 9, an input beam 910 is incident on the axicon 915 which converges a majority of the beam onto the structure that includes a frustum 930 that interfaces with an inverted truncated cone 935. The light that is directed onto the structure undergoes multiple reflections (i.e., TIR and/or reflections from the coated inside surfaces) and emerges as an annular irradiance pattern on the photoconductive switch 920. In some embodiments, the inverted truncated cone 930 is solid (e.g., $SiO_2$). In other embodiments, the inverted truncated cone 930 is a hollow with a reflective metal coating on its surfaces. As depicted in FIG. 9, there is very little light on the center of the photoconductive switch and the light is spread over the annular region corresponding to the top electrode.

Embodiments of the disclosed technology provide a frustum for delivering illumination to a photoconductive switch that includes a top section having a first cross-sectional area and configured to receive light having a first irradiance, and a bottom section configured to receive light from the top section and to allow the received light to propagate through the bottom section and reach a lower opening, the lower opening having a larger cross-sectional area than the first cross-sectional area, wherein the bottom section comprises an axially symmetric region bounded by an inner surface and an outer surface to allow the light that is received by the bottom section to travel through the axially symmetric region before reaching the lower opening, and wherein the lower opening is configured to deliver light to a photoconductive material having a second irradiance that is lower than the first irradiance.

In some embodiments, the lower opening has an annular shape formed at a lower section of the axially symmetric region having a conical shape.

In some embodiments, the lower opening has a polygonal shape formed at a lower section of the axially symmetric region having a pyramidal shape.

In some embodiments, the frustum is configured to receive light from an optical waveguide or an optical fiber, and a center of the optical waveguide or optical fiber is axially aligned with an axis that runs through a center of the first cross-sectional area and the axially symmetric region.

In some embodiments, with reference to FIG. 2, the inner surface and the outer surface are reflective surfaces to allow the light to undergo reflections upon traveling through the axially symmetric region. In some embodiments, one or more of the reflective surfaces include a reflective coating.

In some embodiments, with reference to FIG. 5, the axially symmetric region is configured to allow light to travel therethrough by total internal reflection.

In some embodiments, the top section is cylindrical shaped and the bottom section is conical shaped, and the top and bottom sections are made fully of glass.

In some embodiments, a length of the top section and a length of the bottom section are substantially equal to each other.

In some embodiments, the top section is a truncated cone and the bottom section is an inverted truncated cone, and the top and bottom sections are made fully of glass.

In some embodiments, a length of the bottom section is substantially longer than a length of the top section.

In some embodiments, the top section and the bottom section form a unitary structure to allow light that is received by the top section to immediately propagate to the bottom section.

In some embodiments, the first cross-sectional area is coupled to an optical fiber that is configured to deliver the light having the first irradiance.

In some embodiments, the axially symmetric region includes an outer cone that is a right circular cone, and an aperture of the outer cone formed by the lower opening is configured to minimize the light from being reflected off the upper surface of the photoconductive material switch and traveling backwards through the axially symmetric region.

In some embodiments, the second irradiance is lower than the first irradiance by a factor between twenty-seven to forty-five times.

Embodiments of the disclosed technology further provide a device for illuminating a photoconductive material that includes a truncated cone comprising an upper surface with a first diameter that is configured to receive illumination having a first irradiance from an optical fiber, and a lower surface with a second diameter that is proximate to an upper surface of a cylinder, the second diameter being larger than the first diameter, and the cylinder comprising the upper surface configured to receive illumination from the truncated cone, and a lower surface, proximate to a photoconductive material, configured to deliver light to the photoconductive material having a second irradiance that is lower than the first irradiance, wherein the truncated cone and the cylinder are configured to propagate the light from the upper surface of the truncated cone to the lower surface of the cylinder using total internal reflection.

In some embodiments, with reference to FIG. 6, the truncated cone and the cylinder are fully solid with a refractive index different from the space around the device.

In some embodiments, electrodes coupled to the photoconductive material are arranged in a coaxial arrangement.

In some embodiments, with reference to FIG. 7, wherein the cylinder is a hollow cylinder, and an internal volume of the cylinder is substantially void of light.

The described embodiments advantageously enable the use of an optical fiber as a light source (which is easier to use than a laser source) while ensuring that the incident light on the photoconductive switch does not damage the switch. This is achieved, in part, by using frustums that employ total internal reflection to spread the light from an output of the optical fiber to a larger annular region on the surface of the photoconductive switch.

Figure 10:
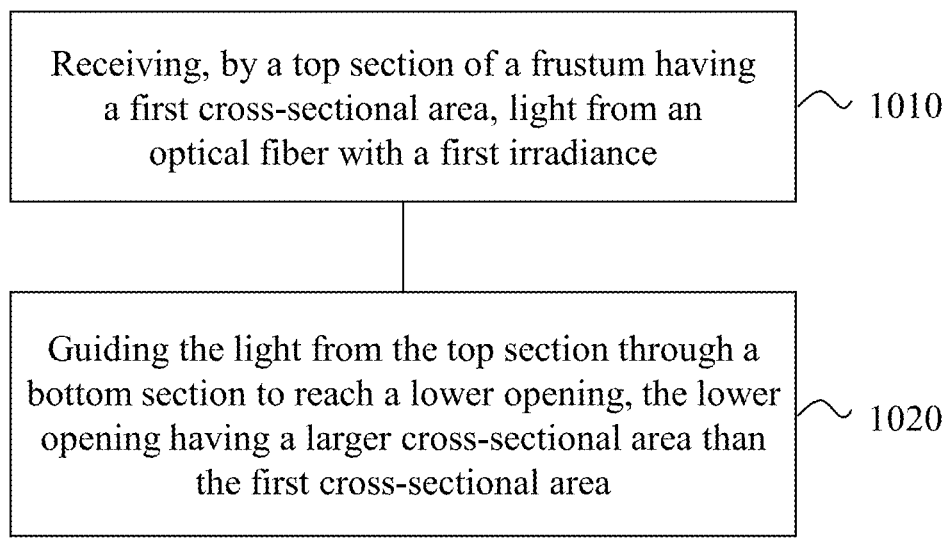
FIG. 10 is a flowchart of an example method of illuminating a photoconductive switch.

FIG. 10 is a flowchart of an example method illuminating a semiconductor switch as described in the example embodiments above. The method 1000 includes, at operation 1010, receiving, by a top section of a frustum having a first cross-sectional area, light from an optical fiber with a first irradiance.

The method 1000 includes, at operation 1020, guiding the light from the top section through a bottom section to reach a lower opening, the lower opening having a larger cross-sectional area than the first cross-sectional area. In some embodiments, the bottom section comprises an axially symmetric region bounded by an inner surface and an outer surface to allow the light that is received by the bottom section to travel through the axially symmetric region before reaching the lower opening, and the lower opening is configured to deliver light to a photoconductive material having a second irradiance that is lower than the first irradiance.

In some embodiments, the light propagates through the photoconductive material and reflects off of a lower surface of the photoconductive switch.

In some embodiments, the inner surface and the outer surface are reflective surfaces to allow the light to undergo reflections upon traveling through the axially symmetric region.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this disclosure.

What is claimed is:

1. A frustum for delivering illumination to a photoconductive switch, comprising:
   a top section having a first cross-sectional area and configured to receive light having a first irradiance; and
   a bottom section configured to receive light from the top section and to allow the received light to propagate through the bottom section and reach a lower opening, the lower opening having a larger cross-sectional area than the first cross-sectional area,
   wherein the bottom section comprises an axially symmetric region bounded by an inner surface and an outer surface to allow the light that is received by the bottom section to travel through the axially symmetric region before reaching the lower opening, and
   wherein the lower opening is configured to deliver light to a photoconductive material having a second irradiance that is lower than the first irradiance.

2. The frustum of claim 1, wherein the lower opening has an annular shape formed at a lower section of the axially symmetric region having a conical shape.

3. The frustum of claim 1, wherein the lower opening has a polygonal shape formed at a lower section of the axially symmetric region having a pyramidal shape.

4. The frustum of claim 1, configured to receive light from an optical waveguide or an optical fiber, and wherein a center of the optical waveguide or optical fiber is axially aligned with an axis that runs through a center of the first cross-sectional area and the axially symmetric region.

5. The frustum of claim 1, wherein the inner surface and the outer surface are reflective surfaces to allow the light to undergo reflections upon traveling through the axially symmetric region.

6. The frustum of claim 1, wherein one or more of the reflective surfaces include an reflective coating.

7. The frustum of claim 1, wherein the axially symmetric region is configured to allow light to travel therethrough by total internal reflection.

8. The frustum of claim 7, wherein the top section is cylindrical shaped and the bottom section is conical shaped, and the top and bottom sections are made fully of glass.

9. The frustum of claim 8, wherein a length of the top section and a length of the bottom section are substantially equal to each other.

10. The frustum of claim 7, wherein the top section is a truncated cone and the bottom section is an inverted truncated cone, and the top and bottom sections are made fully of glass.

11. The frustum of claim 10, wherein a length of the bottom section is substantially greater than a length of the top section.

12. The frustum of claim 1, wherein the top section and the bottom section form a unitary structure to allow light that is received by the top section to immediately propagate to the bottom section.

13. The frustum of claim 1, wherein the first cross-sectional area is coupled to an optical fiber that is configured to deliver the light having the first irradiance.

14. The frustrum of claim 1, wherein the axially symmetric region includes an outer cone that is a right circular cone, and wherein an aperture of the outer cone formed by the lower opening is configured to minimize the light from being reflected off the upper surface of the photoconductive material switch and traveling backwards through the axially symmetric region.

15. The frustum of claim 1, wherein the second irradiance is lower than the first irradiance by a factor between twenty-seven to forty-five times.

16. A device for illuminating a photoconductive material, comprising:
    a truncated cone comprising:
       an upper surface with a first diameter that is configured to receive illumination having a first irradiance from an optical fiber, and
       a lower surface with a second diameter that is proximate to an upper surface of a cylinder, the second diameter being larger than the first diameter; and the cylinder comprising:
- the upper surface configured to receive illumination from the truncated cone, and
- a lower surface, proximate to a photoconductive material, configured to deliver light to the photoconductive material having a second irradiance that is lower than the first irradiance, wherein the truncated cone and the cylinder are configured to propagate the light from the upper surface of the truncated cone to the lower surface of the cylinder using total internal reflection.

17. The device of claim 16, wherein the truncated cone and the cylinder are fully solid with a refractive index different from the space around the device.

18. The device of claim 17, wherein electrodes coupled to the photoconductive material are arranged in a coaxial arrangement.

19. The device of claim 16, wherein the cylinder is a hollow cylinder, and wherein an internal volume of the cylinder is substantially void of light.

20. A method for delivering illumination to a photoconductive switch, comprising:
- receiving, by a top section of a frustum having a first cross-sectional area, light from an optical fiber with a first irradiance; and
- guiding the light from the top section through a bottom section to reach a lower opening, the lower opening having a larger cross-sectional area than the first cross-sectional area,
- wherein the bottom section comprises an axially symmetric region bounded by an inner surface and an outer surface to allow the light that is received by the bottom section to travel through the axially symmetric region before reaching the lower opening, and
- wherein the lower opening is configured to deliver light to a photoconductive material having a second irradiance that is lower than the first irradiance.

21. The method of claim 20, wherein the light propagates through the photoconductive material and reflects off of a lower surface of the photoconductive switch.

22. The method of claim 20, wherein the inner surface and the outer surface are reflective surfaces to allow the light to undergo reflections upon traveling through the axially symmetric region.

* * * * *